United States Patent [19]

Schorum et al.

[11] Patent Number: 5,043,950
[45] Date of Patent: Aug. 27, 1991

[54] APPARATUS AND METHOD FOR DISTANCE DETERMINATION

[75] Inventors: Stanley Schorum, Madison; Robert Butler, Milford, both of Conn.

[73] Assignee: Science Accessories Corp., Stratford, Conn.

[21] Appl. No.: 467,662

[22] Filed: Jan. 19, 1990

[51] Int. Cl.$^5$ .............................................. G08C 21/00
[52] U.S. Cl. ........................................ 367/98; 367/900; 367/907; 178/18
[58] Field of Search .................... 367/907, 900, 98; 178/18; 364/561

[56] References Cited

U.S. PATENT DOCUMENTS

| | | | |
|---|---|---|---|
| 3,838,212 | 9/1974 | Whetstone et al. | 178/18 |
| 4,012,588 | 3/1977 | Davis et al. | 178/18 |
| 4,124,838 | 11/1978 | Kiss | 367/907 |
| 4,332,016 | 5/1982 | Berntsen | 367/7 |
| 4,357,672 | 11/1982 | Howells et al. | 364/561 |
| 4,464,738 | 8/1984 | Czajkowski | 367/900 |
| 4,488,000 | 12/1984 | Glenn | 178/18 |
| 4,564,928 | 1/1986 | Glenn et al. | 367/117 |
| 4,891,474 | 1/1990 | Kelly | 178/18 |

OTHER PUBLICATIONS

Wells, Physical Principles of Ultrasonic Diagnosis, Academic Press, 1969, title page and pages 77-80.

*Primary Examiner*—Daniel T. Pihulic
*Attorney, Agent, or Firm*—Martin Novack

[57] ABSTRACT

The disclosure is directed to an apparatus and method for determining the travel time of acoustic energy over an unknown travel distance between an acoustic transmitter and an acoustic receiver. This information can be used, for example, to determine the position of a moveable element in a data space. A timer is initiated at the time of acoustic transmission from the transmitter. A control signal generator is provided, and is initiated at the time of acoustic transmission from the transmitter, the control signal being a function of the time which elapses after the time of acoustic transmission. The gain of the signal received at the receiver is controlled in accordance with the control signal. The timer is terminated when the gain-controlled received signal exceeds a predetermined threshold. In a preferred embodiment, the terminating means includes a comparator for comparing the gain-controlled received signal to the predetermined threshold. The magnitude of the control signal varies as $$K(t - P\exp[-t/P])$$

where t is the time elapsed since acoustic transmission, and K and P are constants. The time-varying gain compensation improves the detection process by having a substantially consistent signal level to deal with, so that a suitably sensitive threshold can be employed without undue triggering by spurious noise.

18 Claims, 3 Drawing Sheets

APPARATUS AND METHOD FOR DISTANCE DETERMINATION

BACKGROUND OF THE INVENTION

This invention relates to an apparatus and method for determining the position of a movable element in a data space, and to improvements in techniques for determining the travel time of acoustic energy over an unknown travel distance between an acoustic transmitter and an acoustic receiver.

Graphical digitizers are conventionally used to input graphical coordinate information, or the like, to a companion system. In a graphical digitizer, wave energy is typically passed between a movable element (such as a stylus or cursor) and one or more transducers located at fixed reference locations. The transit time of the wave energy traveling (in either direction) between the movable element and the reference locations is used in determining the position of the movable element, in one, two, or three dimensions, typically in terms of digital coordinates. A type of graphical digitizer manufactured and sold by the assignee hereof, Science Accessories Corporation, measures the transit time of acoustic or sonic energy propagating through air. The transit time of sound traveling from a source on the movable element to each of a plurality of microphones is used, in conjunction with the velocity of sound in air and known geometrical relationships, to compute the position of the movable element.

The accurate determination of the transit time of the acoustic energy between the transmitter and receiver locations is critical to an accurate determination of the position of the movable element. Typically, a timer is provided for each receiver. All of the timers are started when the acoustic energy is transmitted from the transmitter. As the sound is received at each receiver, the timer associated with that receiver is stopped. The transit times to each receiver can then be computed from the time that elapsed on each timer. Typically, each timer is a digital counter which counts pulses from a digital clock generator, and the arrival of acoustic wave energy at each microphone is determined by continuously comparing the microphone output (e.g. an amplified and filtered version thereof) to a predetermined threshold level. When the threshold level is exceeded, the associated counter is turned off. Ideally, the threshold detection operation is such that it will not be triggered by noise, but will be triggered, in consistent fashion, by the arriving acoustic wave energy from the transmitter. Such ideal result is not always achieved, however.

It is among the objects of the present invention to improve operation of the described type of apparatus.

SUMMARY OF THE INVENTION

The present invention is directed to an apparatus and method for determining the travel time of acoustic energy over an unknown travel distance between an acoustic transmitter and an acoustic receiver. This information can be used, for example, to determine the position of a moveable element in a data space. A timer is initiated at the time of acoustic transmission from the transmitter. A control signal generator means is provided, and is initiated at the time of acoustic transmission from the transmitter, the control signal being a function of the time which elapses after the time of acoustic transmission. Means are provided for controlling, in accordance with the control signal, the gain of the signal received at the receiver. Means are also provided for terminating the timer when the gain-controlled received signal exceeds a predetermined threshold.

In a preferred embodiment of the invention, the terminating means includes a comparator for comparing the gain-controlled received signal to the predetermined threshold. In this embodiment, the magnitude of the control signal varies as $$K(t + P\exp[-t/P])$$

where t is the time elapsed since acoustic transmission, and K and P are constants.

The application of this time-varying gain control function tends to equalize the amplitude of the signal received at the microphone, taking into account the distance between the transmitter and receiver, and the losses encountered by the acoustic wave energy in reaching the receiver. It can be noted that when conventional time-gain compensation is utilized, such as in ultrasonic medical imaging applications, a significant portion of the losses to be accounted for are the result of attenuation of the beam as it passes through the transmission medium, whereas in the present instance beam spreading is the dominant factor in received signal diminution as the transmitter and receiver are moved further apart. Unlike typical automatic gain control and time-gain compensation applications, wherein the objective is to listen to an audio signal or display a video signal that is continuously adjusted, the present invention uses time-varying gain control to achieve advantage in a system wherein arrival time is to be accurately detected. The time-varying gain compensation improves the detection process by having a substantially consistent signal level to deal with, so that a suitably sensitive threshold can be employed without undue triggering by spurious noise.

Further features and advantages of the invention will become more readily apparent from the following detailed description when taken in conjunction with the accompanying drawings.

DESCRIPTION OF THE PREFERRED EMBODIMENT

Figure 1:
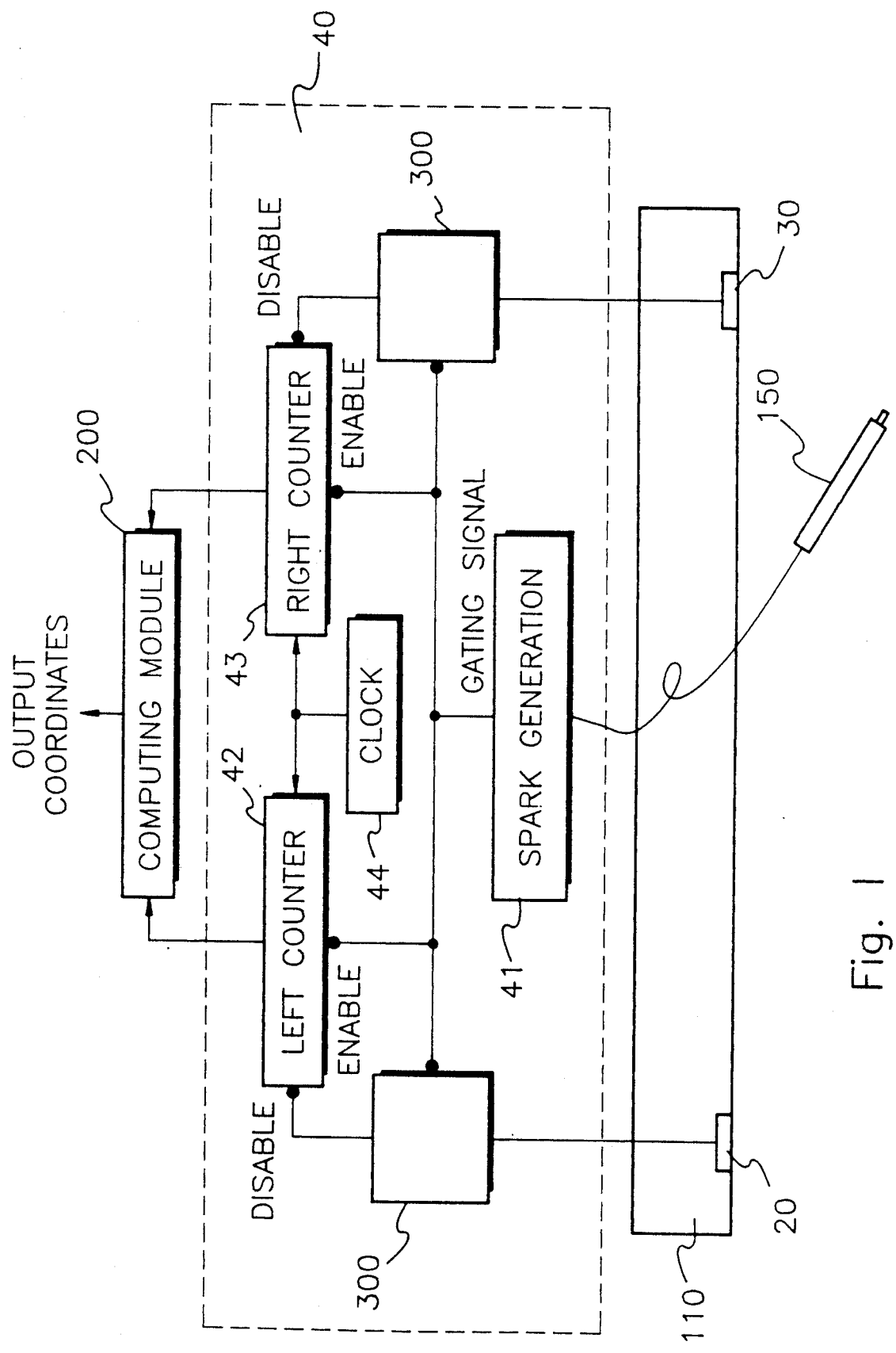
FIG. 1 is a schematic diagram, partially in block form, of an apparatus in accordance with an embodiment of the invention, and which can be used to practice an embodiment of the method of the invention.

Referring to FIG. 1, there is shown an apparatus in accordance with an embodiment of the invention for determining the position of an element movable 150 in a region located to one side of the apparatus. In this illustration, the position of a movable element is determined in two dimensions, but it will be understood that the improvements described herein have application to position determination in one, two, or three dimensions, and which utilizes any desired number or configuration of transmitters and receivers. The apparatus includes an elongated housing 110 which is positioned generally adjacent an edge of the region in which the position of a movable element 150 is to be determined. The housing 110 contains a pair of spaced apart transducers 20 and 30.

In the embodiment of FIG. 1, the transducers 20 and 30 are acoustic receivers, such as point microphones, and the movable element 150 is a stylus (or cursor puck, or other suitable device), which contains a transducer for producing acoustic wave energy. The movable element may be, for example, a spark generating stylus of the type shown in co-pending U.S. patent application Ser. No. 314,562, now U.S. Pat. No. 4,891,474 assigned to the same assignee as the present invention. Techniques for determining the position of a movable element sound emitter with respect to a pair of receivers, such as point microphones, are well known in the art, and reference can be made, for example, to U.S. Pat. No. 4,012,588, or to equipment known as Model GP-7 "GRAFBAR" manufactured and sold by Science Accessories Corporation, the assignee hereof, for description of operation of the type of equipment in which the improvements hereof can be utilized. Briefly, however, and as illustrated in FIG. 1, the travel time duration is determined by circuitry 40, shown for convenience in dashed line to the rear of housing 110, which comprises a left counter 42, associated with the left microphone 20, a right counter 43 associated with the right microphone 30, a clock 44, and a spark generation circuit 41. Coincident with generation of the spark at movable element 150 (and as indicated by a gating signal from circuit 41), the counters 42 and 43 are enabled to begin counting pulses from clock 44. Upon initial reception of the sound wavefront, the microphones 20 and 30, which generally receive the wavefront at different times, produce outputs which are amplified, filtered, and utilized to disable the counters 42 and 43, and also to cause the readout of the respective counts which are indicative of the travel times between the sound source on the movable element and the microphones. The respective distances can then be computed, in known manner, by multiplying the travel times by the velocity of sound in air. This can be implemented, for example, by computing module 200, or any suitable dedicated or general purpose processor.

In accordance with the improvement of the invention, modules 300 are provided and perform functions, including time-varying gain control, to be described momentarily. Consider, first, however the nature of the acoustic energy which is emitted from the stylus, or other suitable approximate point source, and is ultimately received at the microphones. The acoustic energy received at a microphone from a source at a distance x can be expressed as $$e(t) = V(x) \exp[(-w_o/2Q)t] \sin(w_o t) \quad (1)$$

where $V(x)$ is a function of distance between the source and receiving microphone, $w_o$ is the angular frequency of maximum energy in the signal spectrum, and Q is the ratio of the "3 dB bandwidth" to the center frequency. Although the time course of the acoustic energy is essentially invariant, the amplitude envelope of the received signal diminishes as the source and receiver move further apart. For a distance x apart, the function $V(x)$ is reasonably well described for the present embodiment as having the form $$V(x) = 0.8/(x - 7\exp[-x/7]) \quad (2)$$

This equation can be converted to a function of time by replacing x with (c)(t), where c is the velocity of sound in air. Therefore, a gain function $A(t)$, which compensates for the diminution of the signal represented by equation (2), can be expressed as having the form $$A(t) = K(t + P\exp[-t/P]) \quad (3)$$

where K and P are constants. If equation (3) is differentiated with respect to time, we get $$d[A(t)]/dt = K(1 - \exp[-t/P]) \quad (4)$$

The function inside the parenthesis of (4) is relatively easy to generate and then integrate to obtain a gain function as set forth in equation (3). The component values can be selected to obtain the desired constants for a particular application.

Figure 2:
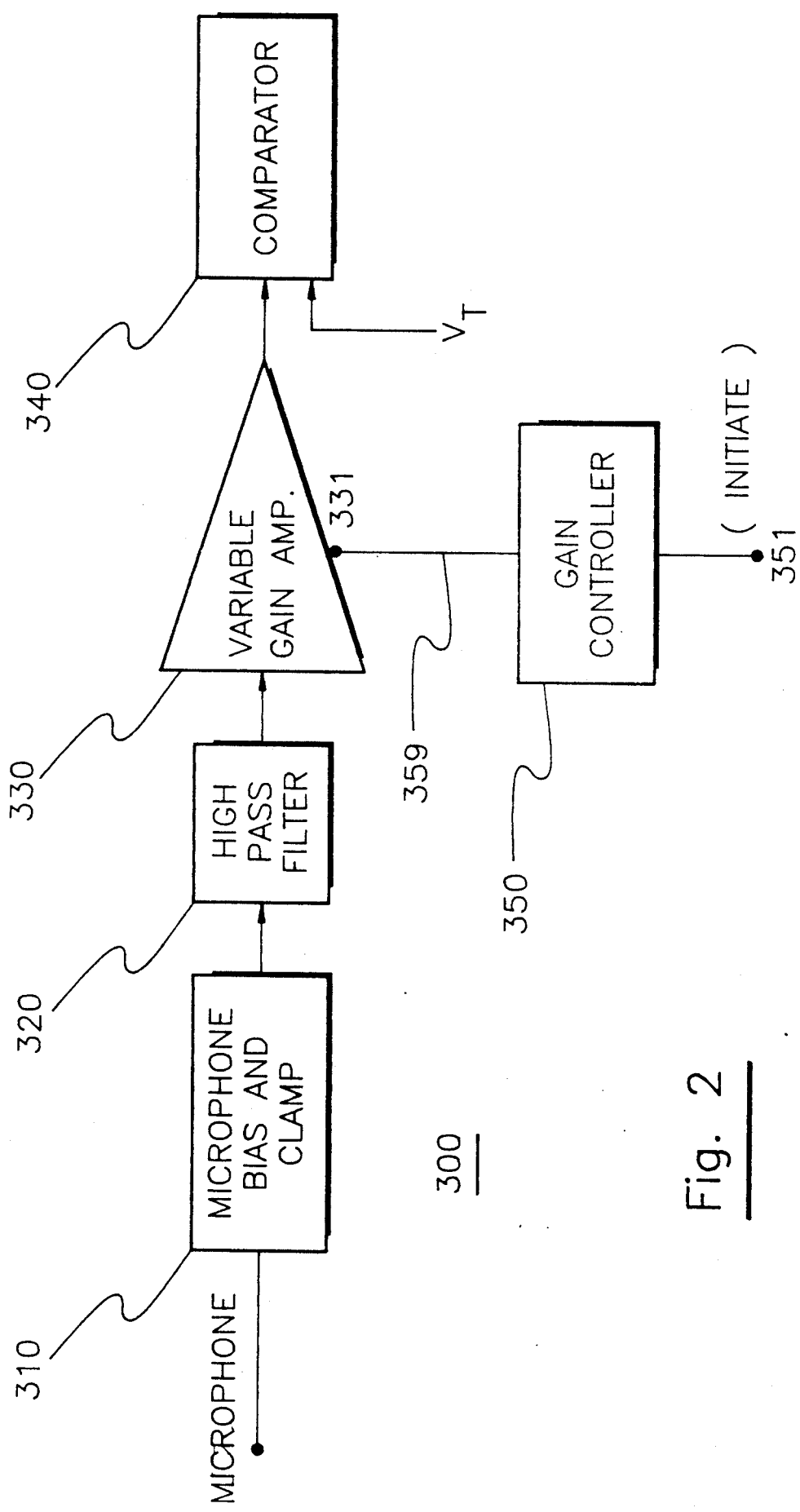
FIG. 2 is a block diagram of the module which processes the microphone output in the FIG. 1 embodiment.

Referring to FIG. 2, there is shown a block diagram of the variable gain and related circuitry that is represented by each of the blocks 300 in FIG. 1. A bias and clamp circuit 310 can, if desired, be provided for the microphone. The microphone output is high-pass filtered, as represented by the block 320, and then coupled to a variable gain amplifier 330. Variable gain amplifiers are well known in the art and any suitable type can be employed. In the present embodiment, the amplifier 330 is of a type which has its gain controlled by a control current that is provided on a line 359 to the control terminal 331 of the variable gain amplifier. The gain control current is generated by a gain controller circuit 350 which, in the present embodiment, provides a gain versus time characteristic of the type set forth in equation (3). The output voltage of the variable gain amplifier 330 is coupled to an input of a comparator 340 which operates to compare that voltage with a suitable threshold voltage, $V_T$.

In operation, the gain controller sequence is initiated by a gating signal (applied at terminal 351) which is output from the spark generation circuit 41 (FIG. 1) and which is also utilized to enable the counters 42 and 43. Thus, the gain controller begins its sequence at a time that is considered as t=o for a particular position measurement. The appropriate gain control, consistent with equation (3) in the present embodiment, is then applied to the variable gain amplifier 330 as a function of time. When the acoustic energy wavefront is received at a microphone (20 or 30 in FIG. 1), the microphone output will be coupled to the variable gain amplifier 330, and then to the comparator 340, to cause a comparator output (which is also the output of module 300 in FIG. 1) that will disable the counter (42 or 43, as the case may be), cause readout to the computing module 42, and reset the counter for the next cycle.

Figure 3:
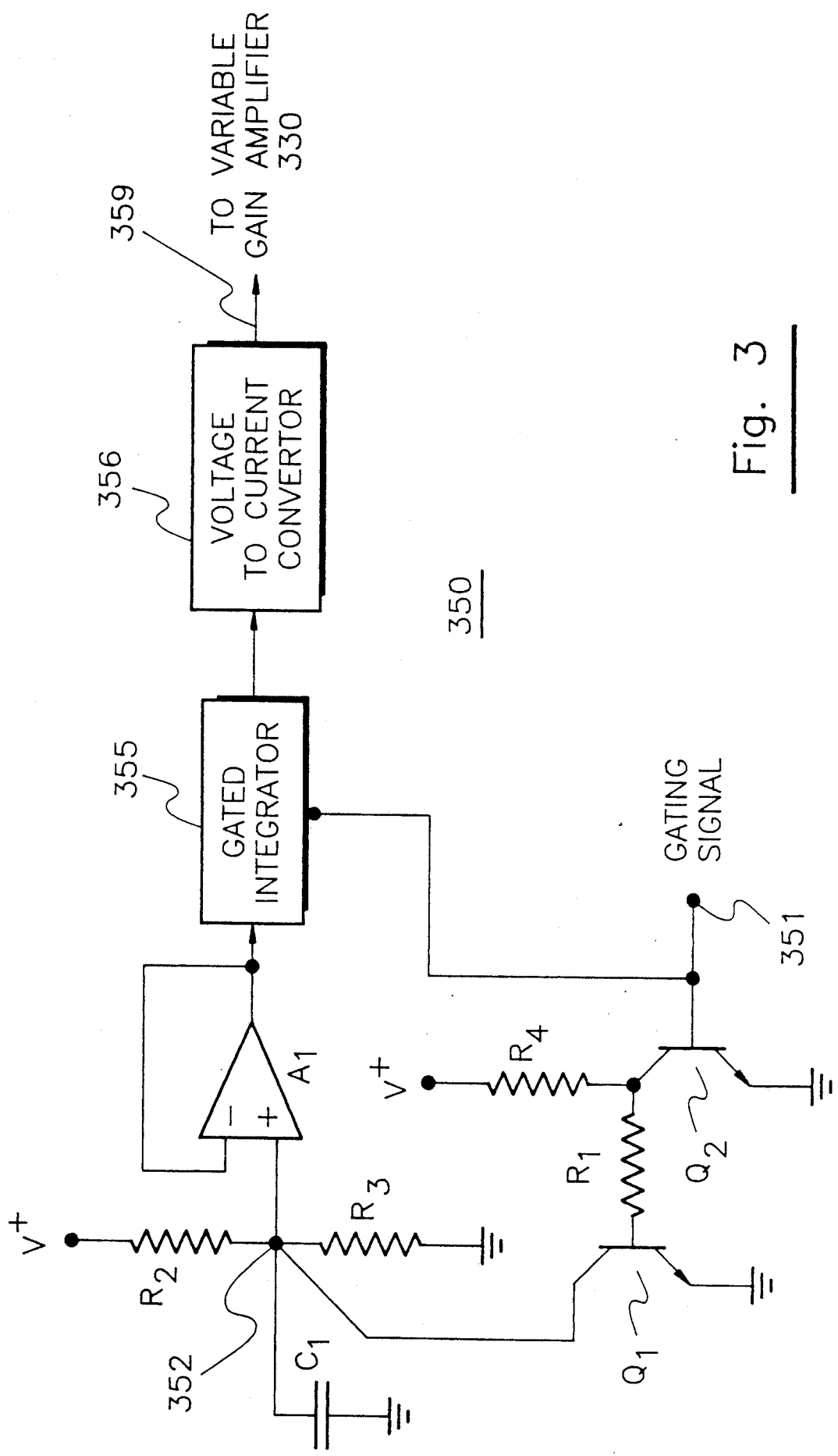
FIG. 3 is a schematic diagram, partially in block form, of the control signal generator of FIG. 2.

An embodiment of the gain controller circuit 350 is illustrated in FIG. 3. In this embodiment, the gating signal from the spark generation circuitry 41 is coupled to terminal 351 which is, in turn, coupled to the gating terminal of a gated integrator 355 and to the base electrode of a transistor $Q_2$. The collector electrode of $Q_2$ is coupled to a positive bias potential $V^+$ via a resistor $R_4$, and the emitter electrode thereof is coupled to ground reference potential. The collector of $Q_2$ is also coupled, via resistor $R_1$, to the base electrode of a transistor $Q_1$. The emitter electrode of transistor $Q_1$ is coupled to ground reference potential, and the collector electrode of transistor $Q_1$ is coupled to the junction point 352 between resistors $R_2$ and $R_3$. The other end of resistor $R_2$ is coupled to a bias potential $V^+$, and the other end of resistor $R_3$ is coupled to ground reference potential. A capacitor $C_1$ is coupled between the junction point 352 and ground reference potential. The junction point 352 is also coupled to the non-inverting input of an operational amplifier $A_1$. The output of amplifier $A_1$ is coupled to the inverting input thereof, so that the amplifier acts as a unity gain voltage amplifier. The amplifier output is also coupled to the input of gated integrator 355, the output of which is coupled to a voltage-to-current converter 356. The output of the voltage-to-current converter is the gain control current on line 359 which is coupled to the control terminal 331 of gain control amplifier 330 (FIG. 2). As above noted, the gating input of the gated integrator 355 receives the gating signal from the spark generation circuitry 41. Typically, the gating signal is the leading edge of a pulse which substantially corresponds in time to the generation of acoustic wave energy. The gating pulse duration can be made longer than the longest expected transit time of the acoustic wave energy being utilized to measure the position of the moveable element, so that its trailing edge can be utilized to reset the integrator 355. In operation of the circuit of FIG. 3, the transistor $Q_2$ is normally off and the transistor $Q_1$ is normally on, so that the junction point 352 is at substantially ground reference potential. When there is a gating pulse from the spark generation circuitry, the transistor $Q_2$ is turned on and the transistor $Q_1$ is turned off, so that the voltage at junction point 352 begins to build up as the capacitor $C_1$ charges asymptotically toward a voltage determined by the voltage divider $R_2$ and $R_3$. The leading edge of the gating pulse had also initiated the operation of the gated integrator 355. The voltage rise at junction point 352 is thus seen to be of the form of equation (4) (as the capacitor voltage rises asymptotically toward a predetermined value), and the integrated version of this voltage, as generated by gated integrator 355, will therefore be in accordance with equation (3). At the end of the gating signal, $Q_1$ will turn on and $C_1$ will discharge quickly through $Q_1$.

The invention has been described with reference to a particular preferred embodiment, but variations within the spirit and scope of the invention will occur to those skilled in the art. For example, and as previously noted, the time-varying gain control hereof can also be applied when using only a single receiver, or when using three or more receivers. The principles hereof also have application when the transmitting and receiving are implemented from substantially the same position, or where a single transducer is utilized for both transmitting and, subsequently, receiving an acoustic signal which has been reflected from an unknown distance. Further, it will be recognized that the invention also has application to situations where more than one transmitter is utilized, such as in a digitizer where the movable element contains a receiver which receives acoustic energy from a plurality of transmitters. In such case, each transmitter, when operative, would initiate a timer and the gain control will function in the manner described above. Finally, it is noted that, if desired, the control signal can be used in another manner to vary the criterion for threshold determination. This approach, while not preferred, could employ a constant gain and would vary $V_T$ (FIG. 2) using the inverse of the described control signal, so that $V_T$ would decrease with time.

What is claimed is:

1. Apparatus for determining the travel time of acoustic energy over an unknown travel distance between an acoustic transmitter and an acoustic receiver, comprising:
    a timer which is initiated at the time of acoustic transmission from the transmitter;
    a control signal generator means, initiated at the time of acoustic transmission from the transmitter, for generating a control signal as a function of the time which elapses after said time of acoustic transmission, the magnitude of the control signal varying as $$K(t + P \exp[-t/P])$$

where t is the time elapsed since acoustic transmission, and K and P are non-zero constants;
    means for controlling, in accordance with the control signal, the gain of the signal received at the receiver; and
    means for terminating the timer when the gain-controlled received signal exceeds a predetermined threshold.

2. Apparatus as defined by claim 1, wherein said terminating means includes a comparator for comparing the gain-controlled received signal to a predetermined threshold.

3. Apparatus as defined by claim 2, wherein said control signal generator means is operative to generate a first signal of the form $$K(1 - \exp[-t/P])$$

and then integrate said first signal to obtain said control signal.

4. Apparatus as defined by claim 2, wherein said timer comprises a digital counter that counts pulses from a clock.

5. Apparatus as defined by claim 1, wherein said acoustic transmitter and said acoustic receiver are spaced apart in air.

6. Apparatus as defined by claim 1, wherein said control signal generator means is operative to generate a first signal of the form $$K(1 - \exp[-t/P])$$

and then integrate said first signal to obtain said control signal.

7. Apparatus as defined by claim 1, wherein said timer comprises a digital counter that counts pulses from a clock.

8. Apparatus for determining the position of a movable element, comprising:
    an acoustic transmitter at the movable element;
    a plurality of acoustic receivers;
    a plurality of timers respectively associated with the acoustic receivers;
    means for energizing the acoustic transmitter, and for initiating the timers at the time of acoustic transmission;
    a control signal generator means, initiated at the time of acoustic transmission from the transmitter, for generating a control signal as a function of the time which elapses after said time of acoustic transmission, the magnitude of the control signal varying as $$K(t - P \exp[-t/P])$$

where t is the time elapsed since acoustic transmission, and K and P are non-zero constants;

means for controlling, in accordance with the control signal, the gain of the signals received at each receiver;

a plurality of terminating means, associated with the respective timers and receivers, for terminating each timer when the gain-controlled received signal from its associated receiver exceeds a predetermined threshold; and means for determining the position of the movable element from the elapsed times of the timers.

9. Apparatus as defined by claim 8, wherein said acoustic transmitter and said plurality of acoustic receivers are spaced apart in air.

10. Apparatus as defined by claim 8, wherein each of said terminating means includes a comparator for comparing its respective gain-controlled received signal to a predetermined threshold.

11. Apparatus as defined by claim 10, wherein each of said timers comprises a digital counter that counts pulses from a clock.

12. Apparatus as defined by claim 10, wherein said control signal generator means is operative to generate a first signal of the form $$K(1-\exp[-t/P])$$

and then integrate said first signal to obtain said control signal.

13. Apparatus as defined by claim 8, wherein said control signal generator means is operative to generate a first signal of the form $$K(1-\exp[-t/P])$$

and then integrate said first signal to obtain said control signal.

14. Apparatus for determining the travel time of acoustic energy over an unknown travel distance between an acoustic transmitter and an acoustic receiver, comprising:

a time which is initiated at the time of acoustic transmission from the transmitter;

a control signal generator means, initiated at the time of acoustic transmission from the transmitter, for generating a control signal as a function of the time which elapses after said time of acoustic transmission, the magnitude of the control signal varying as $$K(t+P \exp[-t/P])$$

where t is the time elapsed since acoustic transmission, and K and P are non-zero constants;

means for determining when the signal received at the receiver exceeds a predetermined threshold, said determination being controlled by said control signal; and means for terminating the timer when the received signal exceeds said predetermined threshold.

15. Apparatus as defined by claim 14, wherein said acoustic transmitter and said acoustic receiver are spaced apart in air.

16. A method for determining the travel time of acoustic energy over an unknown travel distance, comprising the steps of:

transmitting acoustic energy over the travel distance;

initiating a timer at the time of acoustic transmission;

generating a control signal as a function of the time which elapses after said time of acoustic transmission, said control signal having a magnitude which varies as $$K(t+P \exp[-t/P])$$

where t is the time elapsed since acoustic transmission, and K and P are non-zero constants;

receiving the acoustic energy which has traveled over the travel distance, and producing a received signal in response thereto; controlling, in accordance with the control signal, the gain of the received signal; and terminating the timer when the gain-controlled received signal exceeds a predetermined threshold.

17. The method as defined by claim 16, wherein said terminating step includes comparing the gain-controlled received signal to a predetermined threshold, and terminating the timer when said threshold is exceeded.

18. The method as defined by claim 16, wherein said step of generating a control signal includes generating a first signal of the form $$K(1-\exp[-t/P])$$

and then integrating said first signal to obtain said control signal.

* * * * *